Jan. 6, 1925.
W. W. SWEARINGER
BICYCLE CONNECTER
Filed July 28, 1923
1,522,039
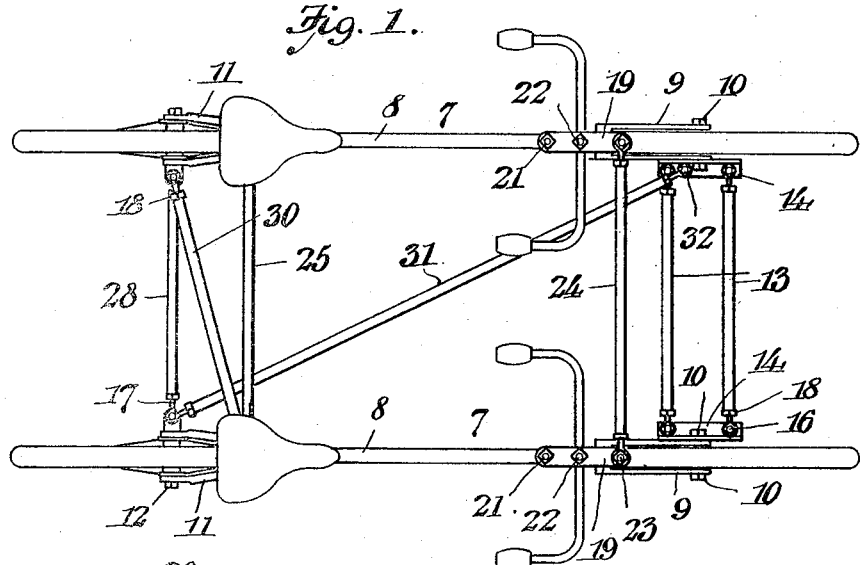
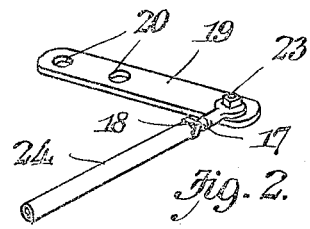
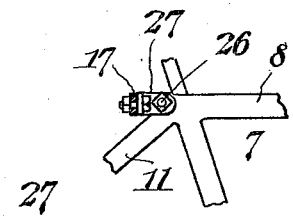
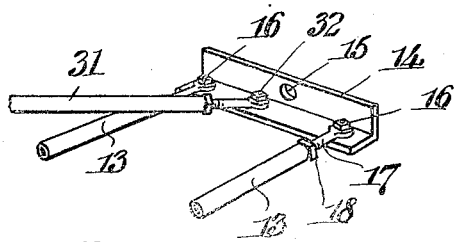
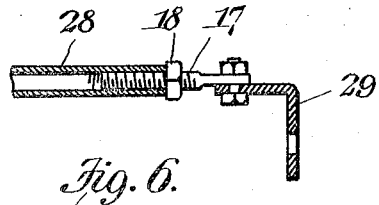
Walter W. Swearinger,
INVENTOR.
BY
ATTORNEY Patented Jan. 6, 1925.

1,522,039

UNITED STATES PATENT OFFICE.

WALTER W. SWEARINGER, OF REMMEL, ARKANSAS.

BICYCLE CONNECTER.

Application filed July 28, 1923. Serial No. 654,332.

*To all whom it may concern:*

Be it known that I, WALTER W. SWEARINGER, a citizen of the United States, residing at Remmel, county of Jackson, State of Arkansas, have invented certain new and useful Improvements in Bicycle Connecters, of which the following is a specification.

This invention relates to bicycle connecters, an important object of which is to provide a connecter which may be easily and quickly attached to and adjusted upon the bicycles to maintain the latter rigid with each other in spaced parallel relation, and wherein no change or alteration in the construction of either bicycle is necessary or required in the proper application and use of the connecter.

A further object of the invention is to provide a connecter of such construction that after once have been attached to the spaced bicycles, minute and accurate adjustments may be made to properly maintain the bicycles in true spaced relation.

A further object of the invention it to provide mechanism of such character as to be applicable to bicycles now in use, and which in no way injures the bicycles or mars their appearance.

A still further object of the invention is to provide an attachment for bicycles which holds the same rigidly together in spaced parallel relation, whereby two persons may ride at the same time, dividing the effort required to propel the vehicle, which is of simple construction, which is composed of a minimum of parts, all constructed and assembled in such manner as to preclude breakage or derangement, which may be manufactured at extremely small cost, which may be applied to the bicycles without the exercise of special skill or knowledge, and which will prove thoroughly practical and efficient in use.

With these objects in view, together with others which will appear as the description proceeds, the invention consists in the novel construction, combination and arrangement of parts, all as will be described more fully hereinafter, illustrated in the drawings, and particularly pointed out in the claims.

In the drawings:

Fig. 1 is a plan view of the improved attachment applied to a pair of bicycles,

Fig. 2 is a detail perspective view of the handle bar connecting member,

Fig. 3 is a similar view of the coupling for the steering forks of the bicycle,

Fig. 4 is a fragmentary view in side elevation, and showing the manner in which the bicycle frames are connected adjacent to the saddle posts, Fig. 5 is a detail perspective view of one of the saddle post or rear hub connecters, and Fig. 6 is an enlarged sectional view, showing the construction of the connecters.

Referring in detail to the drawings, the bicycles are indicated generally at 7, and each includes frames 8, steering forks 9, having front wheels attached thereto by the hub bolts 10; rear forks 11, to which the rear or drive wheels are applied, and which are held thereto by the hub bolts 12.

The front forks of the spaced bicycles are coupled together by a pair of rods 13 maintained in spaced parallel relation, and in making this connection a pair of brackets 14 are employed. Each bracket is of comparatively short length, being straight throughout its length and preferably formed of light angle iron, having one of its flat sides provided intermediate the ends of the iron with an opening 15 to receive the hub bolt 10 of the steering fork. The other side of the iron is provided near the ends of the same with openings to receive coupling bolts 16, to which the rods 13 are secured. The angle irons or brackets 14 are secured one to each of the inside or adjacent forks of the bicycles, as shown.

The rods 13 are identical in construction arrangement and operation with the other coupling rods to be hereinafter described, and a description of one will suffice for all.

Each rod consists of a tubular member, each of a proper length for its particular use, having internal threads at its ends, adapted to threadedly receive the inner ends of tip members 17. The tip member has its outer end broadened and flattened and apertured to receive a coupling bolt indicated at 16, and a lock or jamb nut 18 threaded upon the inner portion of the stem 17 may be forced against the adjacent end of the tube, when the proper adjustment has been made, to lock the tip and rod together. This arrangement enables the length of the coupling rods to be accurately governed.

The handle bars of the bicycles are each provided with a forwardly extending arm 19, each having its inner end provided with spaced openings 20 to receive the bolts 21 and 22 carried by the handle bars for securing the same to the steering post of the bicycle and in making proper adjustments of handle bars. The forward extremity of each arm 19 is apertured to receive the coupling bolt 23 for the tip of the handle bar connecter rod 24.

The rear portions of the bicycle frames are connected by a rod 25, attaching at its ends near the saddle posts of the bicycles. In making this connection, the saddle post adjusting nut 26 is employed, and passes through one end of a bracket 27, of angular shape, holding the bracket securely in proper position. The other end of the angle bracket is apertured as shown to receive the tip of the connecter rod 25.

The rear forks of the bicycles are in like manner connected together, a rod 28 being used. Each rear fork carries an angular bracket 29, through one end of which the rear hub bolt 12 passes, and to the other end of which the tip of the rod 28 connects.

An angularly disposed rod, connecting the saddle post portion of one bicycle with the rear fork of the other, aids materially in stabilizing the bicycles and adding rigidity to the structure. This rod, indicated at 30, has its tip at one end attached to the angle bracket 29, and its opposite tip connected to the bracket 27 of the saddle post connecter part.

To further stabilize the structure and to reinforce the front wheel connecters, a second angularly disposed bar is used. This bar, designated by 31 connects at its rear end with the rear hub bracket of one bicycle, and the tip at its opposite end is connected to the angle bracket at the forward end of the other bicycle; a bolt 32 establishing this connection.

All of the bars, as above set forth, are provided at each end with the adjustable tip features, whereby all of the bars may be adjusted to the proper lengths. The nature of these adjustments is such that the bars may be lengthened or shortened very quickly and easily, and when once adjusted and the lock nuts applied, danger of the same becoming loose is obviated.

The bars in the preferred form of the invention are tubular, as described, however it is to be understood that the invention is not limited to use with this particular type of bar, as other forms may equally as well be employed. Other variations in the minor details of construction may be also resorted to without departing from the spirit of the invention as defined by the claims.

From the foregoing it is apparent that I have provided a coupling device for bicycles of extremely simple construction and operation, and which may be applied to the bicycles with little effort and without the necessity of special tools or equipment. The device is so applied that it is unnecessary to change any of the bicycle construction or parts, and yet the bicycles will be held rigidly together at all times.

By the use of a connecter of this character, two persons may ride together, contributing mutually to the effort necessary to propel the bicycles. By applying a board or seat between the bicycles, as for instance having the ends thereof rest upon the opposite frame bars of the bicycles, more than two may ride, and baggage or camping equipment may also be carried between the bicycles or upon certain of the cross rods connecting the same.

Having thus described my invention, I claim:

1. The combination with a pair of bicycles, a bracket secured to the steering fork of each of said bicycles, rods connecting said brackets, and a rod secured at one end to one of said brackets and at its opposite end to a rigid frame portion of the other bicycle.

2. The combination with a pair of bicycles, of a pair of brackets each secured intermediate its ends one to the steering fork of one and the other to the steering fork of the other of said bicycles, rods connecting the ends of one bracket with the ends of the other, and a rod connecting one of said brackets with a rigid frame portion of the opposite bicycle.

3. The combination with a pair of bicycles, of lateral bars connecting the handle bars, steering forks, saddle posts and rear hubs of said bicycles and maintaining the same in spaced parallel relation, and a pair of diagonal bars, one connecting the saddle post of one of said bicycles with the rear fork of the other, and the other bar connecting a rigid rear frame portion of one of said bicycles with the steering fork of the other.

4. The combination with a pair of bicycles, of a pair of angle brackets each connected intermediate its ends one to the hub of the steering fork of one and the other to the steering fork of the other of said bicycles, a rod connecting the ends of one bracket with the corresponding end of the opposite bracket, and means for longitudinally adjusting said rods.

5. The combination with a pair of bicycles arranged in spaced parallel relation, of a bar connecting the handle bars of said bicycles and rods connecting the steering forks thereof, a rod connecting the saddle posts of said bicycles, a rod connecting the rear frame forks of the bicycles and a rod connecting the saddle post of one of said bicycles with the rear frame fork of the other, and a diagonal rod connecting the rear frame fork of one of said bicycles with the steering fork of the other.

6. The combination with a pair of bicycles, of laterally disposed bars connecting the front and rear portions of said bicycles, a rod connecting the hub portion of the front wheel of one bicycle with the rear hub portion of the other bicycle, and an angularly disposed rod connecting the saddle post of the last mentioned bicycle with the rear hub portion of the other bicycle.

In testimony whereof I affix my signature.

WALTER W. SWEARINGER.